United States Patent [19]

Wilcox

[11] Patent Number: 4,495,800

[45] Date of Patent: Jan. 29, 1985

[54] METHOD FOR DETERMINING OPTIMUM CONCENTRATION OF HYDRATION INHIBITOR FOR CLAYS IN DRILLING FLUIDS

[75] Inventor: Roy D. Wilcox, Bellaire, Tex.

[73] Assignee: NL Industries, Inc., New York, N.Y.

[21] Appl. No.: 441,855

[22] Filed: Nov. 15, 1982

[51] Int. Cl.³ ............................................. G01N 15/06
[52] U.S. Cl. ........................................................ 73/61.4
[58] Field of Search .................................. 73/61.4, 53

[56] References Cited

U.S. PATENT DOCUMENTS

| | | |
|---|---|---|
| 2,543,871 | 3/1951 | Salathiel ................................ 73/61.4 |
| 2,733,595 | 2/1956 | Twing ............................... 73/61.4 X |
| 2,786,977 | 3/1957 | Blagg et al. . |
| 2,830,266 | 4/1958 | Southwick et al. . |
| 3,172,286 | 3/1965 | Grubb et al. . |
| 3,286,510 | 11/1966 | Parker . |
| 3,289,467 | 12/1966 | Parker et al. . |
| 3,296,126 | 1/1967 | Diener et al. . |
| 3,561,548 | 2/1971 | Mondshine . |
| 3,572,930 | 3/1971 | Morcom et al. .................. 73/61.4 X |
| 3,654,164 | 4/1972 | Sperry . |
| 3,989,630 | 11/1976 | Walker . |
| 4,033,893 | 7/1977 | Mondshine . |

*Primary Examiner*—James J. Gill
*Assistant Examiner*—Joseph W. Roskos
*Attorney, Agent, or Firm*—Browning, Bushman, Zamecki & Anderson

[57] ABSTRACT

A method is provided for selecting the optimum concentration of inhibitors such as soluble salts to effect maximum clay swelling and dispersion inhibition in an aqueous fluid of water-swellable, argillaceous materials including clays as exemplified by bentonite and argillaceous sediments, such as shales, encountered in drilling operations. In this method filtration measurements are first taken to develop a filtration parameter from which the optimum inhibitor concentration is readily determined.

17 Claims, No Drawings

METHOD FOR DETERMINING OPTIMUM CONCENTRATION OF HYDRATION INHIBITOR FOR CLAYS IN DRILLING FLUIDS

BACKGROUND OF THE INVENTION

1. Field of the Invention

This invention relates to a method for determining the optimum inhibitor concentration in an aqueous fluid having dispersed therein a water-swellable, argillaceous material. More particularly, this invention relates to a method for determining the optimum inhibitor concentration required in an aqueous fluid to effect maximum inhibition of clay swelling and dispersion of argillaceous materials including clays as well as argillaceous sediments encountered in drilling operations. In this method measurements which are a function of the swelling, e.g. hydration, are made on the drilling fluid and utilized to ascertain the optimum inhibitor concentration.

2. Prior Art

Frequently in oil and gas well operations argillaceous sediments such as shales are encountered that swell and disperse when contacted with drilling fluids that are of inadequate nature to prevent such clay swelling and dispersion. Previously, drilling programs have been designed to maintain a predetermined inhibitor (such as potassium chloride, sodium chloride, calcium chloride, selective flocculants and coagulants) concentration based on shale dispersion tests, mineralogical analysis and experience in the area. Drilling programs designed in this manner have not proven to be satisfactory since shale dispersion tests are empirical and mineralogical analysis do not yield data that is useful in determining optimum inhibitor concentration. Since clay content and reactivity of argillaceous sediments to water vary from one formation to another in the drilling operation, the inhibitor concentration required for maximum clay swelling and dispersion inhibition will vary from one formation to another. Since inadequate inhibitor concentration can cause clay hydration and dispersion resulting in wellbore sloughing, out-of-gage hole, stuck pipe and fill during trips, optimization of inhibitor concentration to more closely match the nature of the argillaceous sediment can achieve maximum economic and drilling performance when drilling through troublesome shale zones.

The use of filtration tests for determining the stability of colloidal systems in drilling fluids containing clay-swelling inhibitors and protective colloids has been disclosed by Diener et al in U.S. Pat. No. 3,296,126. Walter in U.S. Pat. No. 3,989,630 has disclosed the testing of aqueous low solids drilling fluids containing hydration inhibitors such as calcium sulfate, calcium chloride, etc., to determine the filtration rates.

Apparatus useful for filtering drilling fluids has been described in a number of patents including U.S. Pat. No. 3,172,286, Grubb et al, U.S. Pat. No. 3,286,510, Parker, and U.S. Pat. No. 3,289,467, Parker et al.

In view of the numerous and well-known problems as described above which are associated with drilling operations carried out in areas where formations containing substantial quantities of shale are found, it is apparent that there is a definite need in the art for a reliable, convenient method for determining the optimum hydration inhibitor concentration needed in aqueous fluids to secure maximum clay swelling and dispersion inhibition.

SUMMARY OF THE INVENTION

It is therefore an object of this invention to provide a new and improved method for determining optimum hydration inhibitor concentration of water-swellable clays or clay-containing materials of all types in aqueous fluids.

Another object of this invention is to provide a convenient, easily-conducted method for determining the optimum hydration inhibitor concentration for water-swellable clays or clay-containing materials in aqueous fluids.

The above and other objects of the present invention will become apparent from a reading of the specification, examples and claims which follow.

This invention provides a method for determining the optimum inhibitor concentration required in aqueous inhibited fluids for maximum clay-swelling and dispersion inhibition of water-swelling argillaceous materials including clays and argillaceous sediments such as shale and other clay-containing materials encountered in drilling operations comprising:

(a) determining a parameter for the aqueous inhibited fluid having dispersed therein a quantity of the water-swelling argillaceous material and the inhibitor concentration, which parameter approaches a substantially constant value with increasing concentration of said inhibitor, and (b) determining from said parameter the minimum inhibitor concentration at which said substantially constant value is first obtained.

It has been found that filtration times as derived from the filtration parameter decrease with increasing concentration of the inhibitor to a point at which a substantially constant minimum filtration time is obtained. Surprisingly, it has also been discovered that the sorption index, i.e. the grams of fluid sorbed per gram of argillaceous material, e.g. clay, decreases with increasing concentration of the inhibitor to a point at which a substantially constant sorption index is obtained, the region of constant minimum filtration time and the region of minimum sorption index, e.g. constant maximum sorption or swelling inhibition of the clay components of the fluid occurring at the same general concentration range of the inhibitor. Thus, increases in the hydration inhibitor concentration beyond the concentration at which the constant minimum filtration time or constant minimum sorption index is reached do not result in increased sorption or swelling inhibition of the fluid. Therefore, the minimum concentration at which a substantially constant minimum filtration time or substantially constant minimum sorption index is first obtained, as ascertained by any suitable technique, is the optimum inhibitor concentration for that particular inhibited fluid.

In a preferred embodiment of this invention, the optimum inhibitor concentration is determined by first measuring the filtration times for a number of samples each containing the same amount of the argillaceous material in finely-divided form dispersed in water solutions containing incrementally increasing amounts of the inhibitor. A sufficient number of the samples are examined to determine the constant minimum filtration time from which the optimum inhibitor concentration is found.

DETAILED DESCRIPTION OF THE INVENTION

The method of this invention in which the measurement of the hydration and/or dispersion properties of the inhibited aqueous fluid containing the argillaceous material dispersed therein is required is not limited to the use of any particular method and/or device. Any device that measures or indicates a function of the swelling, e.g. hydration of the clay such as a filtration rate, filtration time, sorption index or any other such fundamental property of a dispersed, partially or totally settled blend of wellbore cuttings (i.e. argillaceous sediments), with solids concentration of material such that a parameter can be obtained, in an aqueous fluid can be utilized in obtaining the data employed in this invention. Usually, when a filtration property is the parameter used, it is the filtration time.

This invention is applicable to the determination of optimum hydration inhibitor concentration in any aqueous fluid having dispersed therein a water-wettable argillaceous material and particularly to a formulation of the components designed to inhibit clay swelling and dispersion and to a filtrate of a drilling fluid or a synthetic filtrate of that fluid.

The optimum concentration of any of the wide variety of aqueous fluid inhibitors known in the art to be suitable for clay swelling and dispersion inhibition of argillaceous materials can be determined by the method of this invention. Inhibitors suitable for use in such inhibited fluids include, for example, alkaline earth metal salts such as calcium sulfate, calcium chloride, etc.; alkali metal salts such as potassium chloride, sodium chloride, etc.; organic flocculants and coagulants such as polyacrylamides, polydimethyldiallyl ammonium chlorides, polydimethylamino-ethylmethacrylates, etc.

This invention is best understood by reference to the following examples which are offered only as illustrative embodiments of this invention and are not intended to be limitative.

EXAMPLE 1

This example illustrates the relationship of the maximum clay swelling and dispersion inhibition capacity of aqueous inhibited fluids to the constant minimum filtration times of such fluids.

Wyoming Bentonite (15 grams) was blended with 250 ml of solutions of varying potassium chloride concentration in water. Filtration times of the resulting dispersed or inhibited systems (depending on potassium chloride concentration) were measured. Using a standard laboratory sorption meter, the Sorption Index, which is a measure of the grams of solution sorbed per gram of clay, also was measured. The following table summarizes the results of blending 15 grams of Wyoming Bentonite with 250 ml of various potassium chloride-water solutions and the effect of those solutions on the amount of water sorbed by the clay.

TABLE I

| Conc KCl, % | Filtration Time Seconds | | Sorption Index gm soln sorbed/gm clay |
|---|---|---|---|
| | 1.8 cm funnel | 1.0 cm funnel | |
| 0 | 1558 | — | 10.7 |
| 12 | 21.6 | 65.4 | 1.9 |
| 14 | 19.9 | 61.0 | 1.6 |
| 18 | 19.0 | 61.3 | 1.6 |

The data in Table I indicate that the filtration times and sorption indices of the dispersed systems decreased with increasing potassium chloride concentration to a point at which a substantially constant minimum filtration time or sorption index was obtained. The concentration at which either of these values was first obtained is termed the critical inhibition concentration (c.i.c.). Finally, the data in this Table show that the optimum inhibitor concentration is about 14 weight percent potassium chloride.

EXAMPLE 2

This example illustrates the determination of the optimum inhibitor concentration for a water dispersion of an argillaceous shale. Such sediments or shales comprise clays, quartz, feldspar and other minerals in the colloidal size range. Clays, however, are the primary reactive component present in such argillaceous sediments.

Shaftesbury Shale cuttings from the lower cretaceous Shaftesbury formation, Alberta, Canada, were collected from a Shell Polymer Mud system from a well being drilled with 20,000–30,000 mg/l potassium ion at depth of 5700–5900 ft. Severe wellbore sloughing was observed two days later in this zone.

The washed shale cuttings were analyzed for potassium and chloride ion by x-ray dispersion technique. Chloride ion was not found, indicating that the shale cuttings were free of drilling fluid contamination. The following results were obtained by the filtration method of Example 1 with 15 grams of 200–325 mesh Shaftesbury Shale dispersed in 250 ml of solution containing various concentrations of potassium chloride (inhibitor). The data obtained are set out in Table II below.

TABLE II

| Concentration of $K^+$, mg/l | Filtration Time, Seconds | Filtration Time, Seconds two filter papers |
|---|---|---|
| 0 | 206.8** | |
| 1955 | 69.6* | 175.7* |
| 7820 | 62.1* | 161.0* |
| 19550 | 58.1* | 142.0* |
| 39100 | | 137.0* |

*average of 3 runs
**average of 6 runs

These results show that a minimum filtration time is obtained between 19,550–39,100 mg/l potassium ion and that since filtration times of clay suspensions or suspensions containing clay have been shown to be dependent on their state of swelling and dispersion, the minimum filtration time corresponds to a state of minimum swelling and dispersion. Therefore, these data indicate the optimum inhibitor concentration occurs at a potassium ion concentration of about 19,550 mg/l.

While use of a filtration property such as filtration time is preferable, sorption index can be used with equally reliable results, the disadvantage being that the sorption technique requires longer times.

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

What is claimed is:

1. A method for determining the optimum inhibitor concentration required in an aqueous inhibited fluid for maximum clay swelling and dispersion inhibition of water-wettable argillaceous materials encountered in drilling operations comprising:

(a) determining a parameter for said aqueous inhibited fluid having dispersed therein a quantity of the water-swelling argillaceous material which parameter is a function of the swelling of the argillaceous material and approaches a substantially constant value with increasing concentration of said inhibitor; and (b) determining from said parameter the minimum inhibitor concentration at which said substantially constant value is first obtained.

2. The method of claim 1 wherein said parameter comprises a filtration property of said fluid.

3. The method of claim 2 wherein said filtration property is filtration time.

4. The method of claim 3 wherein said parameter is determined by measuring the filtration time of dispersions of said argillaceous material in aqueous solutions of varying inhibitor concentration and determining the substantially constant minimum filtration time as a function of inhibitor concentration.

5. The method of claim 1 wherein said parameter comprises a hydration property of said argillaceous material.

6. The method of claim 5 wherein said hydration property is the sorption index defined as gm. solu. sorbed/gm. argillaceous material.

7. The method of claim 6 wherein said parameter is determined by measuring the sorption index of dispersions of said argillaceous material in aqueous solutions of varying inhibitor concentration and determining the substantially constant minimum sorption index as a function of inhibitor concentration.

8. The method of claim 1 wherein the said aqueous inhibited fluid comprises a dispersion of the said argillaceous material in a water solution of the inhibitor.

9. The method of claim 1 wherein said argillaceous material is a clay.

10. The method of claim 1 wherein said argillaceous material is bentonite

11. The method of claim 1 wherein said argillaceous material is an argillaceous sediment.

12. The method of claim 1 wherein said argillaceous material is shale.

13. The method of claim 1 wherein said inhibitor is selected from the group consisting of alkali metal salts, alkaline earth metal salts, organic flocculants, and coagulants.

14. The method of claim 1 wherein said inhibitor is an alkali metal salt.

15. The method of claim 1 wherein said inhibitor is potassium chloride.

16. The method of claim 1 wherein said inhibitor is an alkaline earth metal salt.

17. The method of claim 1 wherein said inhibitor is calcium chloride.

* * * * *